US008719441B2

(12) United States Patent
Grannan et al.

(10) Patent No.: US 8,719,441 B2
(45) Date of Patent: *May 6, 2014

(54) SYSTEM AND METHOD OF RECORDING AND ACCESSING MULTIMEDIA DATA

(75) Inventors: Michael Grannan, Austin, TX (US); Brad Medford, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,087

(22) Filed: Sep. 6, 2012

(65) Prior Publication Data

US 2012/0331170 A1    Dec. 27, 2012

Related U.S. Application Data

(63) Continuation of application No. 11/811,358, filed on Jun. 8, 2007, now Pat. No. 8,285,818.

(51) Int. Cl.
*H04N 7/173*     (2011.01)

(52) U.S. Cl.
USPC ............................................. 709/231; 725/86

(58) Field of Classification Search
None
See application file for complete search history.

(56) References Cited

U.S. PATENT DOCUMENTS

| 7,305,357 B2 * | 12/2007 | Hamilton ...................... 709/217 |
| 7,359,955 B2 * | 4/2008 | Menon et al. ................. 709/219 |
| 2005/0044260 A1 * | 2/2005 | Abramson et al. ............ 709/233 |

* cited by examiner

*Primary Examiner* — Jeffrey R Swearingen
(74) *Attorney, Agent, or Firm* — Toler Law Group, PC

(57) ABSTRACT

A method includes recording multimedia content at a server and receiving, at the server while the multimedia content is being recorded at the server, a request from a customer premise equipment device to initiate transmission of a stream of the multimedia content. The method also includes granting the request from the customer premise equipment device and providing the customer premise equipment device access to the multimedia content.

20 Claims, 10 Drawing Sheets

SYSTEM AND METHOD OF RECORDING AND ACCESSING MULTIMEDIA DATA

CROSS-REFERENCE TO RELATED APPLICATIONS

The present application is a continuation of and claims priority from U.S. patent application Ser. No. 11/811,358 filed on Jun. 8, 2007, the content of which is expressly incorporated herein by reference in its entirety.

FIELD OF THE DISCLOSURE

The present disclosure is generally related to a system and method for recording and accessing multimedia data.

BACKGROUND

Digital video recorders (DVRs) may allow users to record programs onto a memory medium to be accessed at a later time. DVRs may also allow users to control the display of the programs, for example, by allowing a user to pause "live" television. Typically, a DVR may be deployed at each individual subscriber residence. However, installation and maintenance of residentially deployed DVRs is expensive. Additionally, such DVRs may have limited storage capacity that is relatively inconvenient to expand. Moreover, DVRs may not allow a user to access a program that was broadcast in the past or not recorded by the subscriber. Additionally, DVRs may not allow a user to record substantially all available channels simultaneously.

Systems have been proposed to utilize network DVRs, which may record and store data at a network server of a video service provider. Storing video for access by subscribers at a network DVR may require that a considerable amount of data be stored. Hence, there is a need for an improved method and system of recording and accessing multimedia data.

DETAILED DESCRIPTION OF THE DRAWINGS

The disclosure is directed to a system and method for recording and accessing multimedia data. In a particular embodiment, a method includes recording multimedia content at a server and receiving, at the server while the multimedia content is being recorded at the server, a request from a customer premise equipment device to initiate transmission of a stream of the multimedia content. The method also includes granting the request from the customer premise equipment device and providing the customer premise equipment device access to an entirety of the multimedia content.

In another particular embodiment, an apparatus includes a processor and a memory storing instructions executable by the processor to record multimedia content at a server. The instructions are also executable by the processor to receive, at the server while the multimedia content is being recorded, a request from a customer premise equipment device to initiate transmission of a stream of the multimedia content. The instructions are further executable by the processor to grant the request from the customer premise equipment device and to provide the customer premise equipment device access to an entirety of the multimedia content.

In yet another particular embodiment, a non-transitory computer readable storage medium stores instructions, that when executed by a processor, cause the processor to record multimedia content at a server. The instructions, when executed by the processor, also cause the processor to receive, at the server while the multimedia content is being recorded at the server, a request from a customer premise equipment device to initiate transmission of a stream of the multimedia content. The instructions, when executed by the processor, further cause the processor to grant the request from the customer premise equipment device and to provide the customer premise equipment device access to an entirety of the multimedia content.

Figure 1:
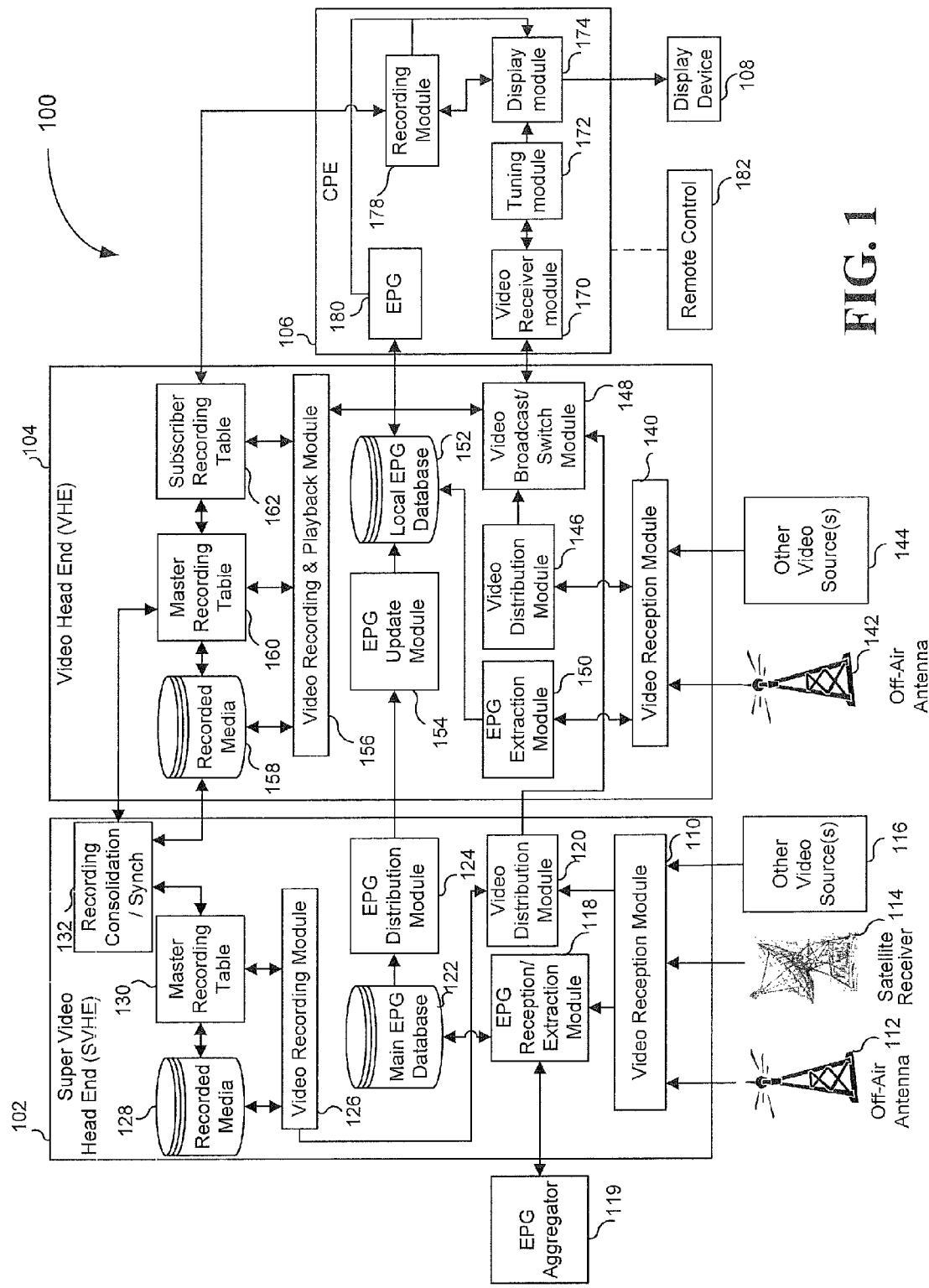
FIG. 1 is a block diagram of a particular illustrative embodiment of a system to record and access multimedia data.

FIG. 1 depicts a block diagram of a particular illustrative embodiment of a system 100 to record and access multimedia data. The system 100 can include a super video head end (SVHE) 102 that provides multimedia content to another video head end (VHE) 104, such as a regional or metropolitan VHE. The VHE 104 may provide the multimedia content to a customer premises equipment (CPE) device 106 for display at a display device 108.

The SVHE 102 may include a video reception module 110 adapted to receive multimedia signals from an off-air antenna 112, a satellite receiver 114, other video source(s) 116, or any combination thereof. The multimedia signals may include video signals, audio signals, or combined video and audio signals. The multimedia signals may be analog signals or digital data signals.

The video reception module 110 may be coupled to an electronic program guide (EPG) reception module 118. The EPG reception module 118 may receive EPG data from an EPG aggregator 119. The EPG reception module 118 may also be coupled to a main EPG database 122. The main EPG database 122 may include program data related to the multimedia signals. The program data may include a program title, a program start time, a program end time, a program rating, a program description, or any combination thereof. The main EPG database 122 may be coupled to an EPG distribution module 124 for distributing the program data to the VHE 104. The video reception module 110 may also be coupled to a video distribution module 120 for distributing the multimedia signals to the VHE 104.

In a particular embodiment, the SVHE 102 may include a video recording module 126. The video recording module 126 may be coupled to the video distribution module 120 to allow stored programs to be distributed to the VHE 104. The video recording module 126 may also be coupled to a recorded media database 128 and a master recording table

130. The master recording table 130 may be coupled to a recording consolidation module 132. In a particular embodiment, the video recording module 126 may be a network based DVR.

The VHE 104 may comprise a video reception module 140 adapted to receive multimedia signals from an off-air antenna 142 and any other video source(s) 144. The multimedia signals may include video signals, audio signals, or combined video and audio signals. The multimedia signals may be analog signals or digital data signals. The VHE 104 may be configured to allow content distribution to multiple CPE devices in a specific region. The specific region may be a metropolitan area, a country, or any other geographic region.

The video reception module 140 may be coupled to an electronic program guide (EPG) extraction module 150. The EPG extraction module 150 may be coupled to a local EPG database 152. The local EPG database 152 may include program data related to the multimedia signals. The program data may include a program title, a program start time, a program end time, a program rating, a program description, or any combination thereof. The local EPG database 152 may be coupled to an EPG update module 154 for receiving program data from the EPG distribution module 124. The video reception module 140 may also be coupled to a video distribution module 146. The video distribution module 146 may be coupled to a video broadcast module 148 for distributing the multimedia signals to the CPE device 106. The video broadcast module 148 may be coupled to the video distribution module 120 of the SVHE 102.

In a particular embodiment, the VHE 104 may include a video recording and playback module 156. The VHE 104 may also include a recorded media database 158, a master recording table 160, and a subscriber recording table 162, all of which may communicate with the video recording and playback module 156. The recorded media database 158 may communicate with the recording consolidation module 132 of the SVHE 102. The video recording and playback module 156 may be coupled to the video broadcast module 148.

The CPE device 106 may include a video receiver module 170, a tuning module 172, a display module 174, a recording module 178, and an EPG module 180. The video receiver module 170 may be coupled to the video broadcast module 148 of the VHE 104. The recording module 178 may communicate with the subscriber recording table 162. The EPG module 180 may communicate with the local EPG database 152 of the VHE 104. The CPE device 106 may be adapted to communicate with a remote control 182.

The CPE device 106 may be coupled to or integrated with a display device 108, such as a television monitor, via the display module 174. The CPE device 106 may include a set-top box device; a video gaming device or a console that is adapted to receive television content; an interface device within the display device 108, such as a cable card; a personal computer or other computing devices that is adapted to emulate set-top box device functionalities; any other device adapted to receive video content and transmit data to a server via an access network; or any combination thereof.

In a particular illustrative embodiment, the video reception module 110 receives at least one multimedia signal from at least one of the off-air antenna 112, the satellite receiver 114, and the other video source(s) 116. The EPG reception module 118 may extract program data from the multimedia signal and provide it to the main EPG database 122. The EPG distribution module 124 may then send the program data from the main EPG database 122 to the EPG update module 154 to update the local EPG database 152. The local EPG database 152 may also include program data from the EPG extraction module 150 that is related to other multimedia signals received via the video reception module 140.

Further, the video distribution module 120 may receive the multimedia signal from the video reception module 110 and send the multimedia signal to the video broadcast module 148. In a particular embodiment, the video distribution module 120 may receive a multimedia signal related to recorded multimedia content from the video recording module 126 and provide the multimedia signal related to the recorded multimedia content to the video broadcast module 148. In a particular embodiment, the video broadcast module 148 may also receive a multimedia signal from the video distribution module 146. The multimedia signal may be received via the video reception module 140 from the off-air antenna 142 or the other video source(s) 144. In another particular embodiment, the video broadcast module 148 may receive a multimedia signal related to recorded multimedia content from the video recording and playback module 156. In yet another particular embodiment, the video broadcast module 148 may receive a multimedia signal related to recorded multimedia content from the video recording module 126 and provide the multimedia signal related to the recorded multimedia content to the CPE device 106. The video broadcast module 148 may provide one of or any combination of the multimedia signals to the CPE device 106.

The CPE device 106 may receive a multimedia signal from the video broadcast module 148 at the video receiver module 170. The tuning module 172 may select a specific channel or content from the multimedia signal and provide that specific channel or content to the display module 174. The specific channel or content may be selected in response to a user input, such as a selection of an element of a graphical user interface via the remote control 182. The electronic program guide module 180 may receive program data from the local EPG database 152 and provide the program data to the graphical user interface. The display module 174 may be adapted to provide the specific channel or content and the graphical user interface to the display device 108.

In a particular embodiment, the CPE device 106 may receive a request to record specific content at the recording module 178. The request may be initiated by a selection of an element of a graphical user interface via the remote control 182. The recording module 178 may determine whether the specific content should be recorded at the CPE device 106 or at another location, such as the VHE 104. The recording module 178 may determine where to store the specific content based on a storage capacity of the CPE device 106; an available bandwidth of a connection from the VHE 104 to the CPE device 106; an ability of the specific content to be recorded at the VHE 104 or the SVHE 102; a likelihood of multiple subscribers in various geographic locations to be requesting recording of the same content; or any combination thereof. In a particular embodiment, the specific content may always be recorded at the VHE 104. In another particular embodiment, a portion of the particular content may be stored at the VHE 104 and a portion may be stored at the CPE device 106.

In another particular embodiment, the VHE 104 may receive a request from the CPE device 106 to record multimedia content. The subscriber recording table 162 may receive an indication from the recording module 178 to record the multimedia content, and an entry related to the multimedia content may be added at the subscriber recording table 162. The subscriber recording table 162 may associate the request to record the multimedia content with a subscriber account corresponding to the CPE device 106. The subscriber recording table 162 may also indicate other multimedia content that is available to the CPE device 106 via the VHE 104.

When an entry to record multimedia content is added to the subscriber recording table 162, the master recording table 160 may be updated to indicate a subscriber has requested the specific multimedia content to be recorded. The master recording table 160 may store data related to a number of subscribers that have requested the multimedia content to be recorded, and this number may be incremented when an entry to the subscriber recording table 162 is made or when the VHE 104 receives a request to record the multimedia content.

The video recording and playback module 156 may record the multimedia content at a storage location associated with the VHE 104. The storage location may include a data storage device, such as a solid state data storage device, a disk drive, an array of disk drives, or any combination thereof. The recorded media database 158 may be updated to indicate that the multimedia content has been stored. The recorded media database 158 may include a pointer to a location of the stored multimedia content. The video recording and playback module 156 may provide the multimedia content to the video broadcast module 148.

In a particular embodiment, the SVHE 102 may store the multimedia content based on information from the VHE 104 or a combination of multiple VHEs. The information may include a number of requests to record the multimedia content, a storage capacity of the VHE 104, an ability of the VHE 104 to store the multimedia content, an ability of the SVHE 102 to store the multimedia content, a number of users (and geographic location) likely to request recording of the content, or any combination thereof.

In a particular embodiment, the recording consolidation module 132 may receive the number of requests to record the multimedia content from the master recording table 160. The recording consolidation module 132 may determine whether the SVHE 102 should store the multimedia content. In a particular embodiment, when the number of requests to record the multimedia content equals or exceeds a threshold, the SVHE 102 may store the multimedia content. Alternatively, the VHE 104 may store the multimedia content in an instance where the SVHE 104 does not have the ability to store the multimedia content, such as when the VHE 104 receives the multimedia content but the SVHE 102 does not receive the multimedia content. Further, the VHE 104 may store the multimedia content when the multimedia content is valid only for CPE devices, such as CPE device 106, connected to the VHE 104. For example, local multimedia content may be restricted for distribution in a specific geographic region.

After the recording consolidation module 132 determines that the SVHE 102 is to store the multimedia content, an entry is added to the master recording table 130 to indicate that the SVHE 102 is to store the multimedia content. The video recording module 126 then schedules and records the multimedia content based on the information in the master recording table 130. The video recording module 126 may update the recorded media database 128 with a pointer indicating a location of the stored media content.

In a particular embodiment, the recording consolidation module 132 may update the master recording table 160 at the VHE 104 to indicate that the SVHE 102 is to store the multimedia content. The recording consolidation module 132 may also update a pointer in the recorded media database 158 to indicate the location of the multimedia content at the SVHE 102.

Figure 2:
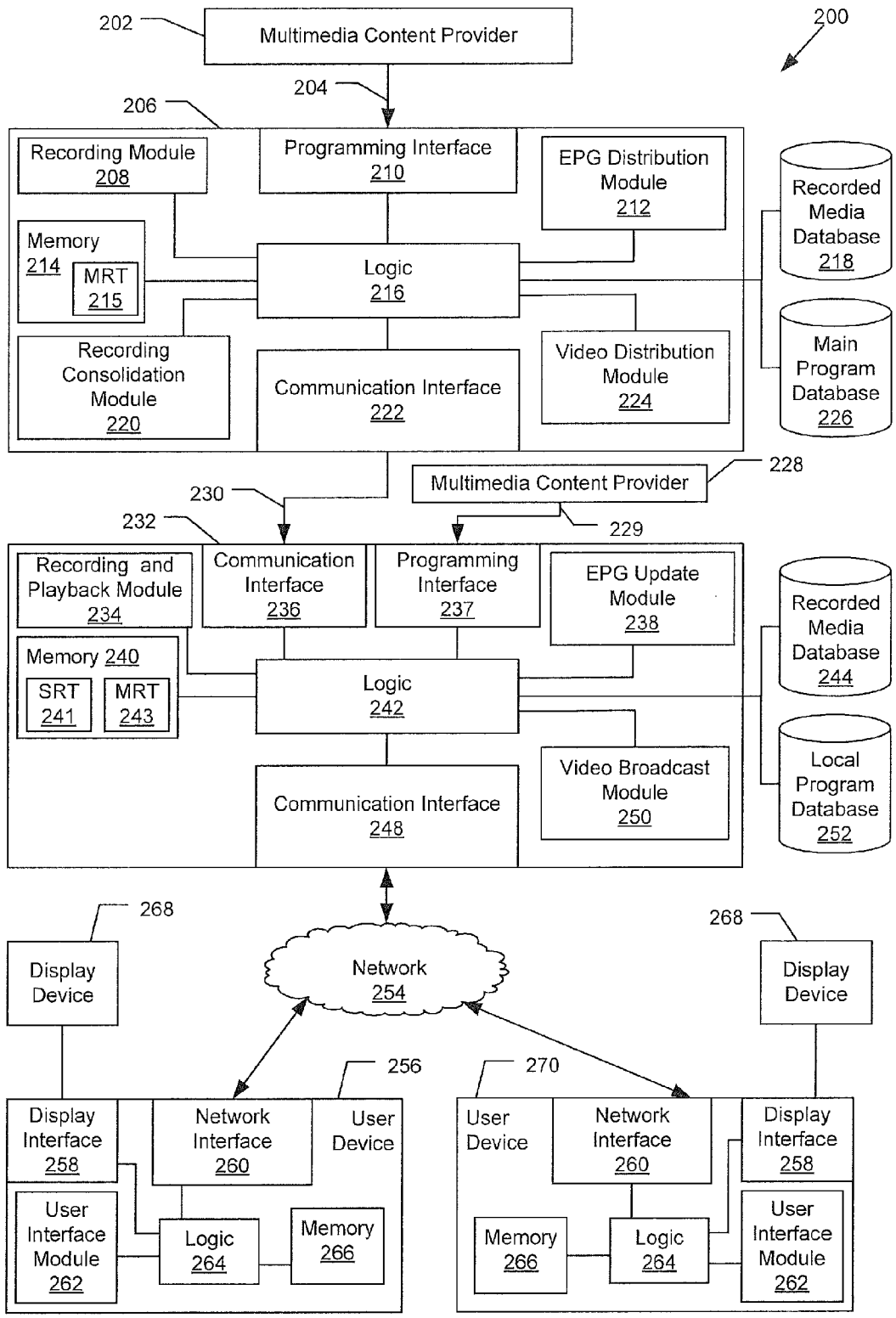
FIG. 2 is a block diagram of a second particular illustrative embodiment of a system to record and access multimedia data.

FIG. 2 depicts a block diagram of a second particular illustrative embodiment of a system 200 to record and access multimedia data. The system 200 includes a first multimedia content provider 202 that communicates via a first communication channel 204 with a super video head end (SVHE) server 206. The SVHE server 206 communicates with a video head end (VHE) server 232 via a communication channel 230. The system 200 also includes a second multimedia content provider 228 that communicates via a second communication channel 229 with the VHE server 232. The VHE server 232 is in communication with a plurality of subscriber devices 256 and 270 via an access network 254.

The SVHE server 206 can include a recording module 208, a programming interface 210, an EPG distribution module 212, a memory 214, logic 216, a recording consolidation module 220, a communication interface 222, and a video distribution module 224. In an illustrative embodiment, the modules may be implemented as hardware, software, or any combination thereof. The memory 214 can include a master recording table 215. The SVHE server 206 can also include or communicate with a recorded media database 218 and a main program database 226.

The VHE server 232 can include a recording and playback module 234, a communication interface 236, a programming interface 237, an EPG update module 238, a memory 240, logic 242, a communication interface 248, and a video broadcast module 250. In an illustrative embodiment, the modules may be implemented in hardware, software, or any combination thereof. The memory 240 can include a subscriber recording table 241 and a master recording table 243. The SVHE server 206 can also include or is in communication with a recorded media database 244 and a local program database 252.

The subscriber devices 256 and 270 include a network interface 260, a user interface module 262, logic 264, memory 266, and a display interface 258 connectable to a display device 268.

In a particular embodiment, the programming interface 210 may receive multimedia programming from the multimedia content provider 202 via the communication channel 204. The communication channel 204 may include satellite signals, fiber-optic signals, air-wave broadcast signals, other radio frequency signals, or any combination thereof. The particular format of the television programming or the protocol used to send the television programming may vary in different embodiments. The video distribution module 224 may provide the multimedia programming to the VHE server 232 via the communication interface 222. In addition, the EPG distribution module 212 may provide program data from the main program database 226 to the VHE server 232 via the communication interface 222.

In a particular embodiment, the communication interface 236 may receive the multimedia programming from SVHE server 206. In addition, the programming interface 237 may receive multimedia programming from the multimedia content provider 228 via the communication channel 229. The communication channel 229 may include satellite signals, fiber-optic signals, air-wave broadcast signals, other radio frequency signals, or any combination thereof. The particular format of the television programming or the protocol used to send the television programming may vary in different embodiments. The video broadcast module 250 may provide the multimedia programming to the subscriber devices 256 and 270 via the communication interface 248. In addition, the EPG update module 238 may receive the program data from the EPG distribution module 212 and may store the program data in the local program database 252. The program data may be provided to the subscriber devices 256 and 270 via the communication interface 248.

The subscriber devices 256 and 270 may receive the multimedia programming and the program data via the network interface 260. The logic 264 may provide the multimedia programming to the display device 268 via the display interface 258. The user interface module 262 may provide a graphical user interface program stored in the memory 266 to the display device 268. The graphical user interface program may include selectable elements that allow a user to initiate a recording of multimedia programming. The user interface module 262 may receive an indication of a user selection of a selectable element of the graphical user interface to record the multimedia programming. The logic 264 may transmit the user selection to the VHE server 232 via the access network 254.

In a particular embodiment, the communication interface 248 may receive control commands from the subscriber devices 256 or 270 via the network 254. For example, the control commands may include a control command to record multimedia programming based on the user selection received from the user devices 256 or 270. The recording and playback module 234 may initiate a recording of the multimedia programming based on the user selection. In another example, the control commands may include a playback request requesting that a program in the recorded media database 244 be transmitted to the subscriber device 256 or 270. In a particular embodiment, the logic module 242 may invoke the recording and playback module 234 after receiving a request to playback a recorded multimedia program from the subscriber device 256 or 270. The control commands may include a request to delete an entry from the subscriber recording table 241.

In a particular embodiment, an entry may be added or updated in the subscriber recording table 241 to indicate a specific subscriber account or subscriber device has requested a recording of the multimedia programming. The recording and/or availability of the multimedia programming may be managed by various digital rights management schemes.

In another particular embodiment, an entry may be added or updated in the master recording table 243 to indicate that the multimedia programming is to be recorded. In a particular embodiment, a number of subscriber devices or a number of subscribers requesting recording of the multimedia programming may be incremented. The recording and playback module 234 may record the multimedia programming to the recorded media database 244 as one or more program data files. A pointer may be updated in the master recording table 243 to indicate the location of the recorded multimedia programming in the recorded media database 244.

A user may send a control command requesting playback of a recorded multimedia program via a user interface presented via the display device 268. The user interface may be generated by the user interface module 262. The user interface may be generated based on program data stored in the subscriber recording table 241. For example, the user interface may include a menu of recorded multimedia programs associated with the subscriber device based on data stored in the subscriber recording table 241.

The recording and playback module 234 may access the recorded multimedia programming and send the recorded multimedia programming data to the subscriber device 256 or 270 via the network 254. In a particular embodiment, the recording and playback module 234 may stream the multimedia programming data to the subscriber device 256 or 270. In another particular embodiment, the recording and playback module 234 may allow the user device 256 or 270 to store the recorded multimedia programming in the memory 266.

In another particular embodiment, the SVHE server 206 may record the multimedia programming. The recording and consolidation module 220 may receive the number of subscriber devices requesting recording of the multimedia programming from the master recording table 243 via the communication interface 222. In a particular embodiment, the recording consolidation module 220 may periodically request the number from the master recording table 243. In another particular embodiment, the logic 242 may compare the number to a threshold and notify the recording and consolidation module 220 when the number is greater than the threshold.

In another particular embodiment, the recording and consolidation module 220 may record the multimedia programming when the number of subscriber devices requesting recording of the multimedia programming is greater than a threshold. In a particular embodiment, the recording and consolidation module 220 may receive data from multiple VHE servers indicating a number of subscriber devices requesting recording of the multimedia programming at a respective VHE server. The recording and consolidation module 220 may aggregate the data from the multiple VHE servers to determine when the SVHE server 206 should record the multimedia programming. For example, the SVHE server 206 may record the multimedia programming when the aggregated data includes a number of requests that is greater than a threshold.

The master recording table 215 may be updated to indicate the SVHE server 206 is responsible for recording the multimedia programming. Further, the master recording table 215 may be updated to indicate the location of the recorded multimedia programming in the recorded media database 218. The master recording table 243 may also be updated to indicate the VHE server 232 is not responsible for recording the multimedia programming. The master recording table 243 may also be updated to indicate the location of the recorded multimedia programming in the recorded media database 218.

In a particular embodiment, the SVHE server 206 and/or the VHE server 232 may record multimedia programming without the multimedia programming being requested by the subscriber devices 256 or 270. The multimedia programming may be recorded based on popularity of the program or a likelihood that the multimedia programming will be requested by the subscriber devices 256 or 270. In a particular embodiment, at least one of the SVHE server 206 and the VHE server 232 may implement a digital rights management mechanism. In a particular embodiment, the digital rights management mechanism may allow a subscriber device to only have access to multimedia programs that were requested to be recorded prior to a start of the multimedia program, within a time frame from the beginning of the multimedia program, or prior to an end of the multimedia program.

In another particular embodiment, the digital rights management mechanism may allow a subscriber device to have access to the multimedia programming for a fee, such as a pay-per-view system or a video-on-demand system. In a particular embodiment, a content provider may determine whether the multimedia programming may be available for viewing when a user device did not request to record the multimedia programming at the VHE 232 prior to a time period, such as a start of the multimedia programming. In another particular embodiment, a user device may be permitted to receive all of a requested program when a request to record the multimedia programming at the VHE 232 was not received until after a start of the requested program.

The SVHE server 206 and the VHE 232 may each comprise one or more servers or other devices capable of performing the described functions. In a particular embodiment, the SVHE server 206 and the VHE 232 are located geographically remote from each other.

Figure 3:
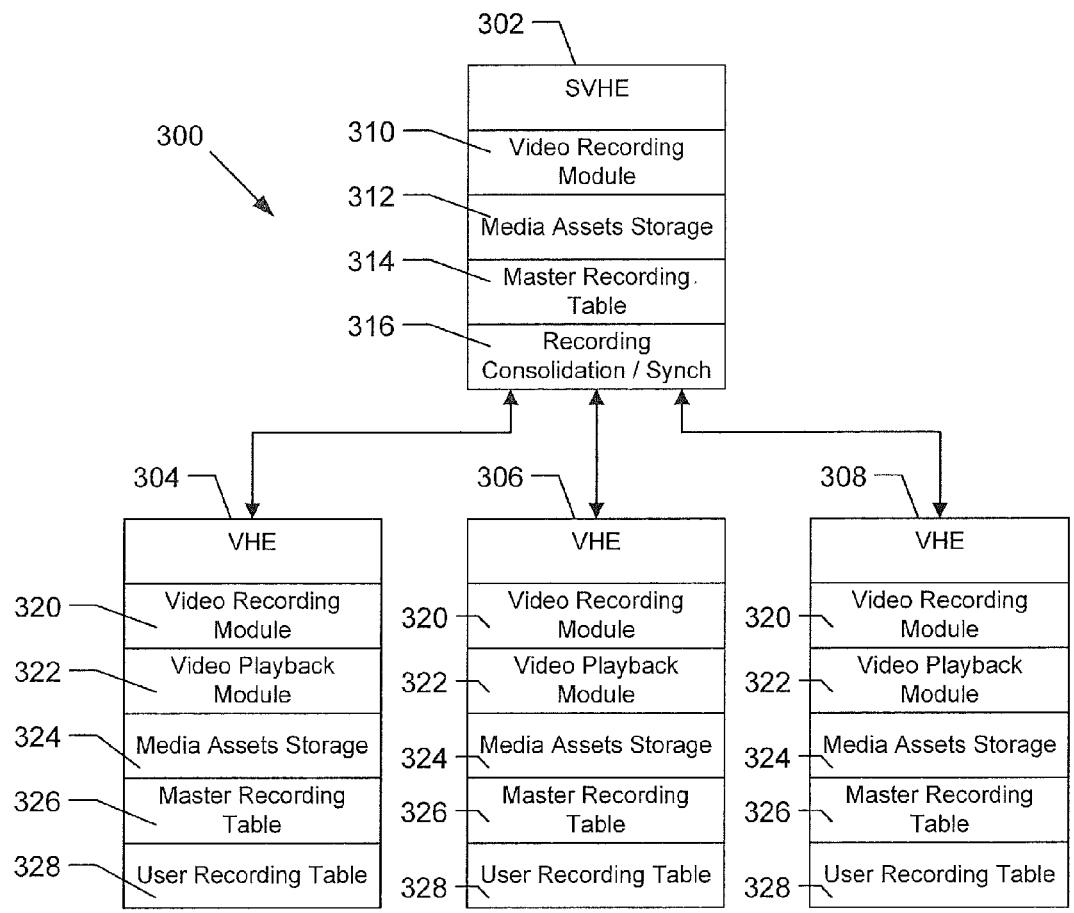
FIG. 3 is a block diagram of a third particular illustrative embodiment of a system to record and access multimedia data.

FIG. 3 depicts a block diagram of a third particular illustrative embodiment of a system 300 to record and access multimedia data. The system 300 can include a super video head end (SVHE) 302 in communication with video head end (VHE) 304, 306, and 308. The SVHE 302 may include a video recording module 310, a media assets storage 312, a master recording table 314, and a recording consolidation/synchronization module 316. Each VHE 304, 306, and 308 may include a video recording module 320, a video playback module 322, a media assets storage 324, a master recording table 326, and a subscriber recording table 328. In a particular embodiment, each VHE 304, 306, and 308 may be located at a geographically remote location from each other, such as in distinct buildings or in distinct cities.

In a particular embodiment, the SVHE 302 may receive multimedia programming from a multimedia content provider. The SVHE 302 may provide the multimedia programming to each VHE 304, 306, and 308. Each VHE 304, 306, and 308 may provide the multimedia programming to one or more user devices, such as the user devices 256 and 270 shown in FIG. 2.

In a particular embodiment, each VHE 304, 306, and 308 may receive control commands from a user device, such as the CPE device 106 shown in FIG. 1 or the subscriber devices 256 and 270 shown in FIG. 2. For example, the control commands may include a control command to record multimedia programming based on the user selection of a particular multimedia program. The video recording module 320 may initiate recording of the particular multimedia program based on the user selection. The particular multimedia program may be stored as one or more program data files in the respective media assets storage 324. In another example, the control commands may include a playback request requesting that a multimedia program in the media assets storage 324 be transmitted to the user device. The video playback module 322 may initiate sending the particular multimedia program to the user device.

In a particular embodiment, an entry may be added or updated in the user recording table 328 to indicate a specific subscriber account or subscriber device has requested a recording of the particular multimedia program. An entry may also be added or updated in the master recording table 326 to indicate that the particular multimedia program is to be recorded. A pointer may be updated in the master recording table 326 to indicate the location of or a location allocated to store the particular multimedia program in the media assets storage 324. In a particular embodiment, the VHE 304, 306, and 308 may store a number representing a number of requests to record the particular multimedia program.

In another particular embodiment, the SVHE 302 may record the multimedia programming. The recording consolidation/synchronization module 316 may receive the number of requests to record the multimedia program from the VHE 304, 306, and 308. The video recording module 310 may store the multimedia program in the media assets storage 312 based on the number of requests. The recording consolidation/synchronization module 316 may aggregate the number of requests from each of the VHE 304, 306, and 308 to determine when the SVHE 302 should store the particular multimedia program.

In a particular embodiment, the recording consolidation/synchronization module 316 may record the multimedia program when the number of requests is greater than a threshold. The master recording table 314 may be updated to indicate the SVHE 302 is responsible for recording the multimedia programming. Further, the master recording table 314 may be updated to indicate the location of or a location allocated to store the particular multimedia program in the media assets storage 312. Each master recording table 326 may also be updated to indicate the VHE 304, 306, and 308 are not responsible for recording the multimedia program. The master recording table 326 may also be updated to indicate the location of or a location allocated to store the particular multimedia program in the media assets storage.

Figure 4:
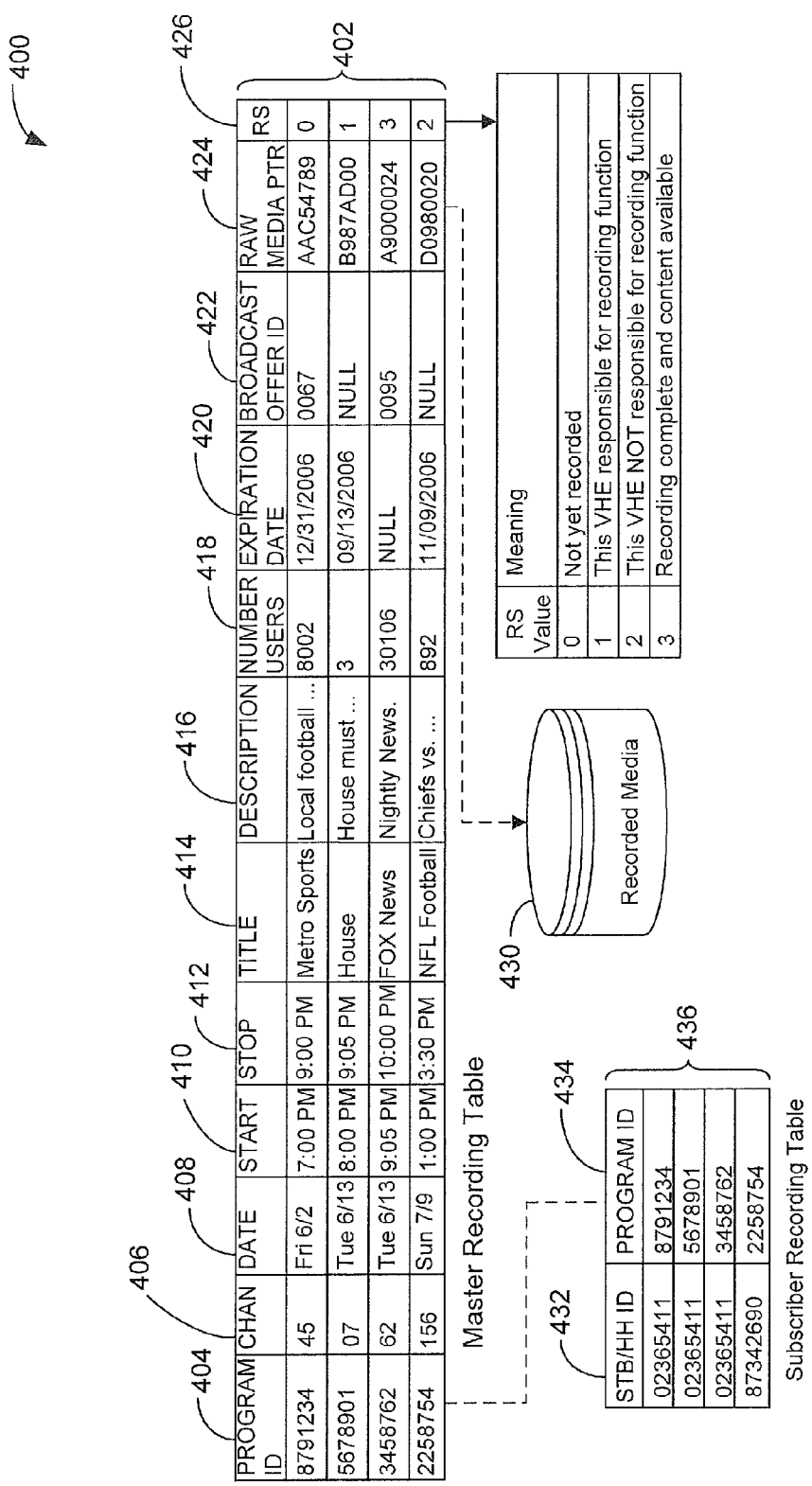
FIG. 4 is a representation of a data structure of a particular illustrative embodiment of a system to record and access multimedia data.

FIG. 4 depicts a representation of a data structure 400 of a particular illustrative embodiment of a system to record and access multimedia data. The data structure 400 may include a master recording table 402, a subscriber recording table 436, and a recorded media storage 430.

In a particular embodiment, the subscriber recording table 436 may include a subscriber or user device identification 432 and a program identification 434. The subscriber recording table may indicate what multimedia programs may be available to a user device based on the subscriber or user device identification 432.

The master recording table 402 may indicate attributes of multimedia programs. The attributes may include a program identification 404, a channel number 406, a date 408, a start time 410, a stop time 412, a title 414, a description 416, a number of users 418, an expiration date 420, an offer identification 422, a pointer 424 to a location of the multimedia program, and a status of the multimedia program 426. The offer identification 422 may identify one of multiple offers related to the multimedia program. The offers may include an offer to purchase a multimedia program for viewing, such as a pay-per-view offer or video-on-demand offer. The status may identify whether the multimedia content is not yet recorded, a video head end (VHE) is responsible for recording the multimedia program, the VHE is not responsible for recording the multimedia content, and if the multimedia content is recorded and available.

In a particular embodiment, program identification data and subscriber or user device identification data may be added to the subscriber recording table 436 based on a request from a user device, such as the CPE device 106 shown in FIG. 1 or the subscriber devices 256 and 270 shown in FIG. 2. The program identification data may indicate a multimedia program listed in the master recording table 402 based on the program identification 404. The master recording table 402 may store a number of users 418 requesting the multimedia program. The master recording table 402 may also store a pointer 424 that identifies a location of the multimedia program in the recorded media storage 430. In a particular embodiment, the pointer 424 may indicate a storage location that has been allocated to store the multimedia program.

Figure 5:
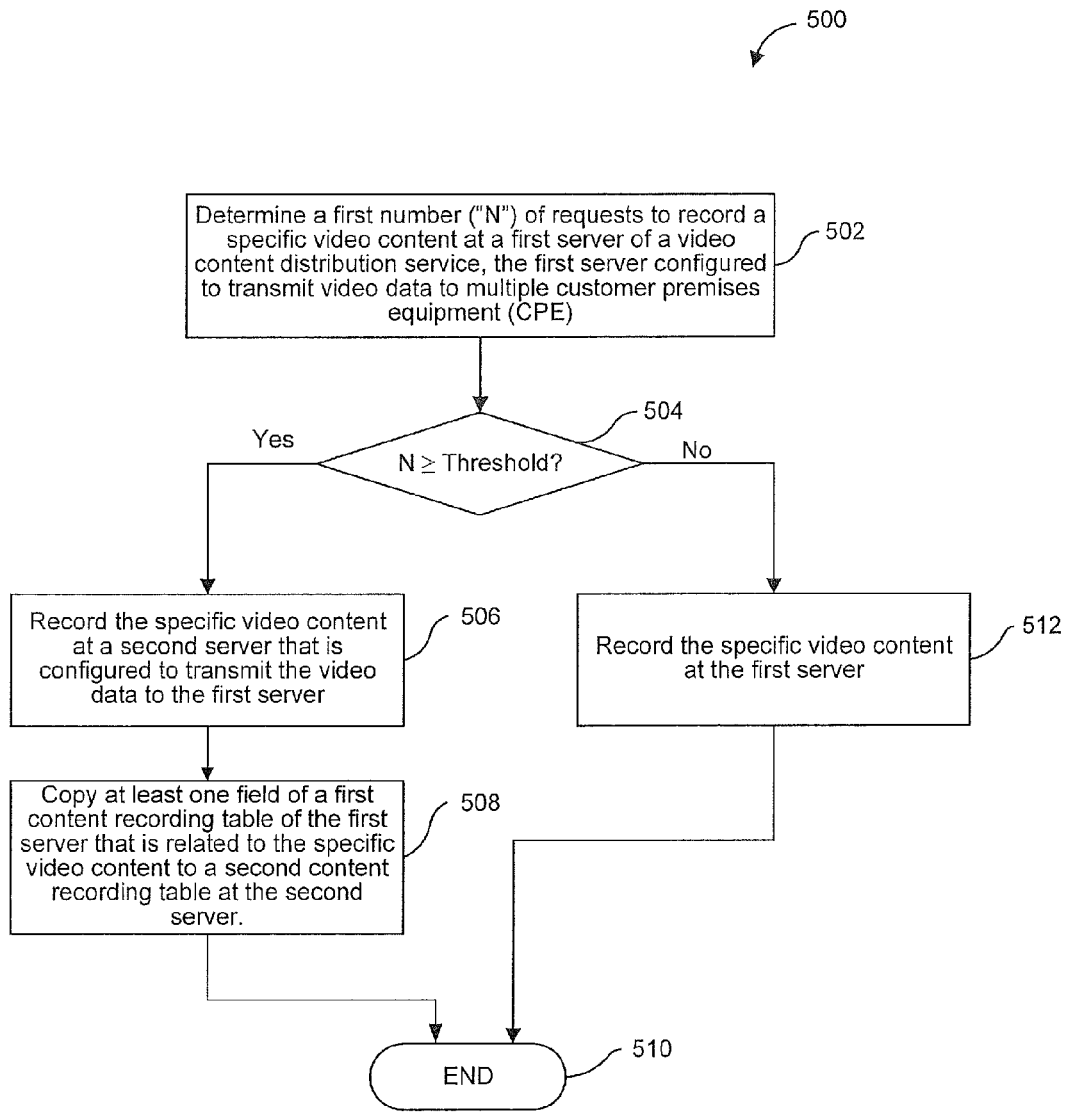
FIG. 5 is a flow chart of a particular illustrative embodiment of a method of recording multimedia data.

FIG. 5 depicts a flow chart of a particular illustrative embodiment of a method 500 to record multimedia data. The method 500 may include determining a first number of requests to record a specific multimedia content at a first server of a multimedia content distribution service, at 502. The first server may be configured to transmit multimedia data to multiple customer premises equipment (CPE) devices. The method 500 may also include recording the specific multimedia content at a second server, at 506, when the first number of requests is greater than or equal to a threshold, at 504. The second server may be configured to transmit the multimedia data to the first server. At 508, at least one field of a first content recording table of the first server that is related to the specific video content is copied to a second content recording table at the second server. The method 500 may also include recording the specific multimedia content at the first server when the number of requests is below the threshold, at 512. The method 500 terminates at 510.

In a particular embodiment, the second server may be configured to transmit the multimedia data to the first server and to a third server. The third server may be configured to transmit the multimedia data to multiple CPE devices.

Figure 6:
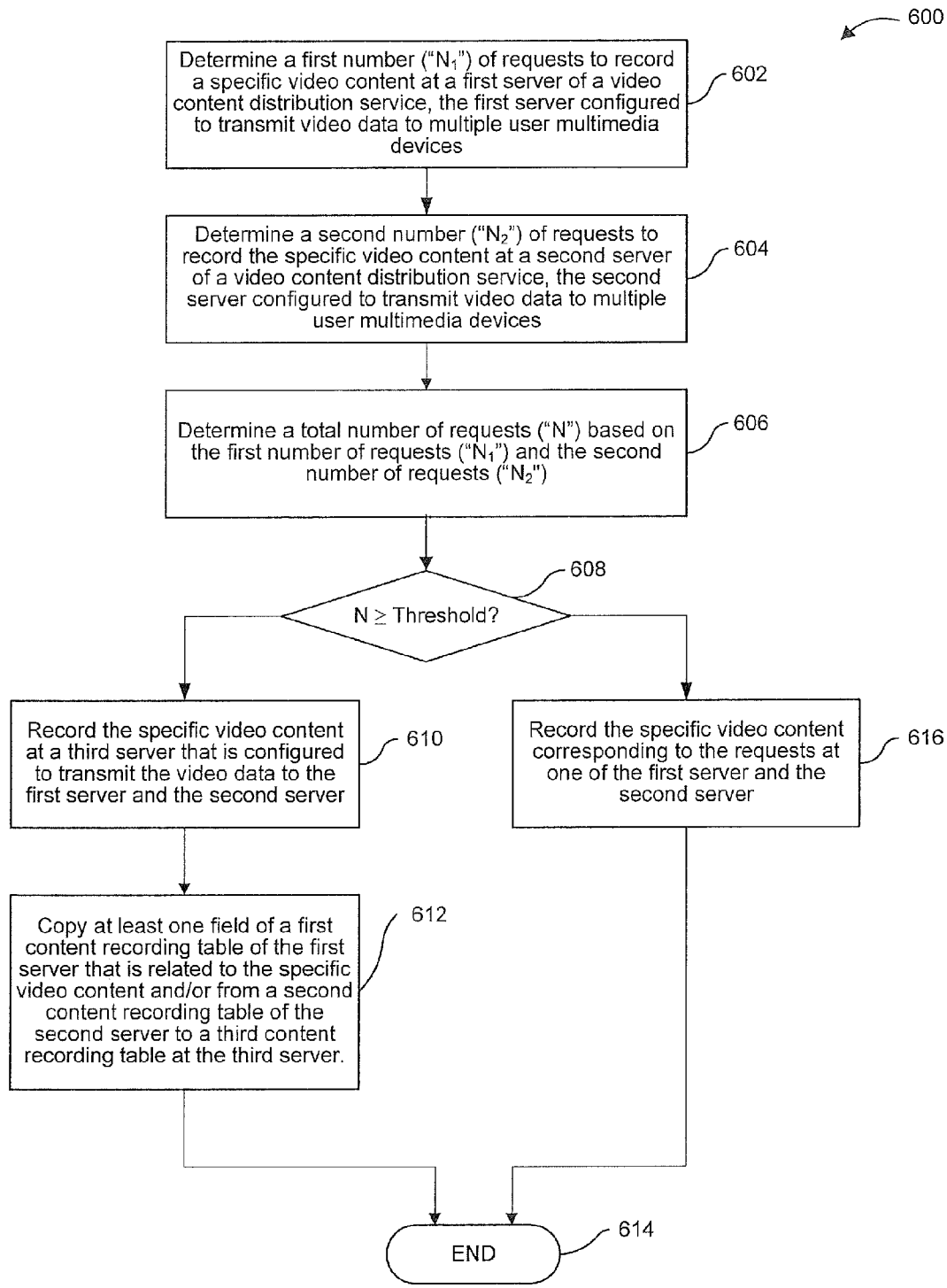
FIG. 6 is a flow chart of a second particular illustrative embodiment of a method of recording multimedia data.

FIG. 6 depicts a flow chart of a second particular illustrative embodiment of a method 600 to record multimedia data. At 602, the method includes determining a first number ($N_1$) of requests to record a specific video content at a first server of a video content distribution service. The first server is configured to transmit video data to multiple user multimedia devices, such as CPE devices, computing devices, portable media devices, or any combination thereof. Advancing to 604, the method also includes determining a second number ($N_2$) of requests to record the specific video content at a second server of the video content distribution service. The second server is also configured to transmit video data to multiple user multimedia devices.

Proceeding to 606, a total number of requests (N) is determined based on the first number of requests ($N_1$) and the second number of requests ($N_2$). In a particular illustrative embodiment, the total number of requests may be calculated by adding the first number of requests and the second number of requests. The method 600 also includes determining whether the total number of request (N) is equal to or exceeds a threshold, at 608. In a particular embodiment, the method 600 includes comparing the total number of requests to the threshold. When the total number of requests (N) is equal to or greater than the threshold, the method 600 advances to 610 and the specific video content is recorded at a third server that is configured to transmit the video data to the first server and/or to the second server. Moving to 612, the method 600 also includes copying at least one field of a first content recording table of the first server that is related to the specific video content and/or from a second content recording table of the second server to a third content recording table at the third server. The at least one field may relate to the specific multimedia content. The first content recording table may identify the multimedia content that the first server is responsible to record. The second content recording table may identify the multimedia content that the second server is responsible to record. The first and second content recording tables may include one or more fields to store the first number of requests. The third content recording table may identify the multimedia content that the third server is responsible for recording. In a particular illustrative embodiment, a status field may be set in one of the first, second or third content recording tables to indicate which particular server is responsible to record the specific multimedia content. The third content recording table may include a field to store a total number of requests for the specific multimedia content from multiple servers. The method terminates at 614.

Returning to 608, when the total number of requests (N) is less than the threshold, the method 600 advances to 616 and the specific video content corresponding to the requests is recorded at one of the first server and the second server. The method terminates at 614.

Figure 7:
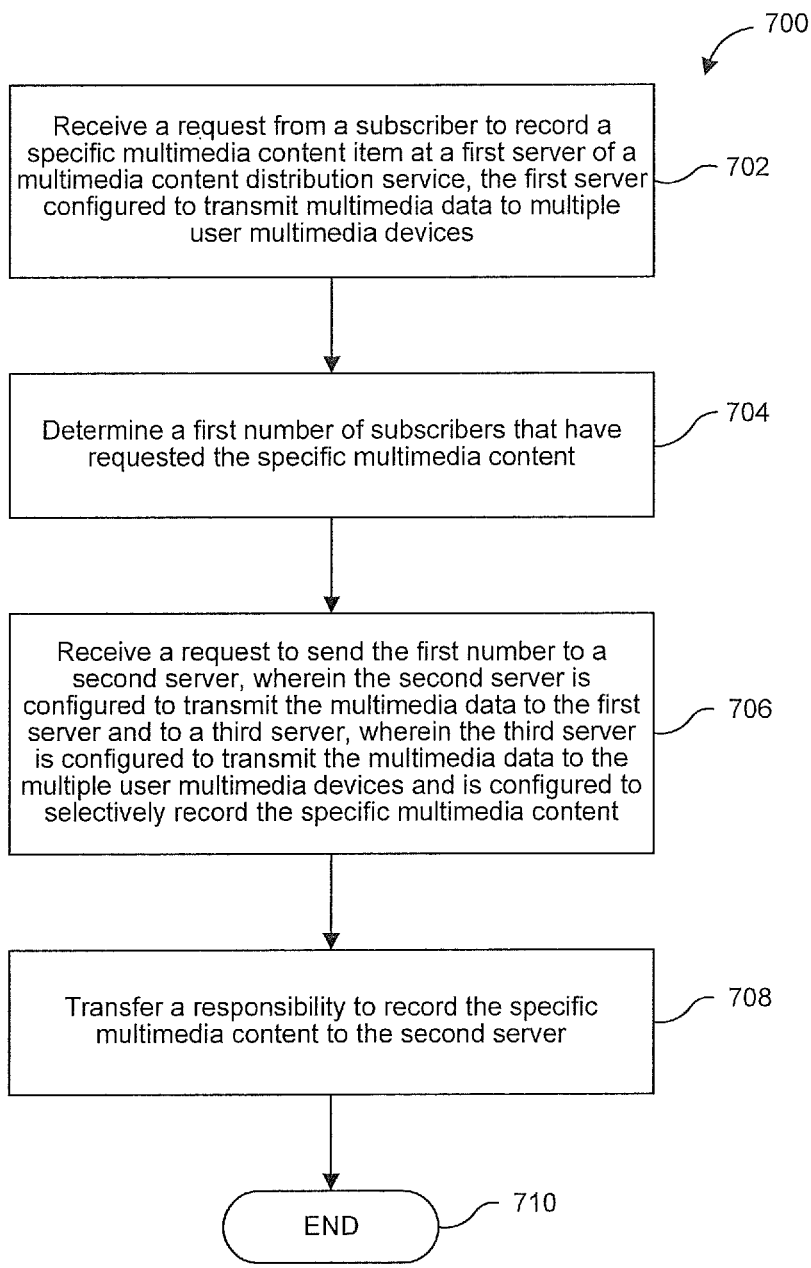
FIG. 7 is a flow chart of a third particular illustrative embodiment of a method of recording multimedia data.

FIG. 7 depicts a flow chart of a third particular illustrative embodiment of a method 700 to record multimedia data. The method 700 may include receiving a request from a subscriber to record a specific multimedia content item at a first server of a multimedia content distribution service, at 702. The first server may be configured to transmit multimedia data to multiple user multimedia devices. The method 700 may also include determining a first number of subscribers that have requested the specific multimedia content, at 704.

The method 700 may further include receiving a request to send the first number to a second server, at 706. The second server may be configured to transmit the multimedia data to the first server and to a third server. The third server may be configured to transmit the multimedia data to the multiple user multimedia devices and may also be configured to selectively record the specific multimedia content. The method 700 may include transferring a responsibility to record the specific multimedia content to the second server, at 708. The method 700 terminates at 710.

In a particular embodiment, the method 700 may include selectively not recording the specific multimedia content when the second server has the responsibility to record the specific multimedia content. The method 700 may also include storing first data based on the specific multimedia content. The first data may identify the specific multimedia content to be recorded. The first data may include an entry in a user recording table identifying the specific multimedia content to be recorded. The user recording table may list content requested to be recorded based on an identification of the subscriber. The method 700 may also include determining the responsibility based on a status indicator associated with the first data.

In a particular embodiment, the method 700 may include sending the first number to the second server. In another particular embodiment, the method 700 may include receiving a request from the second server to send the first data to the second server. In yet another particular embodiment, the method 700 may also include sending the first data to the second server. The method 700 may also include modifying the status indicator to indicate the second server has the responsibility to record the specific multimedia content.

Figure 8:
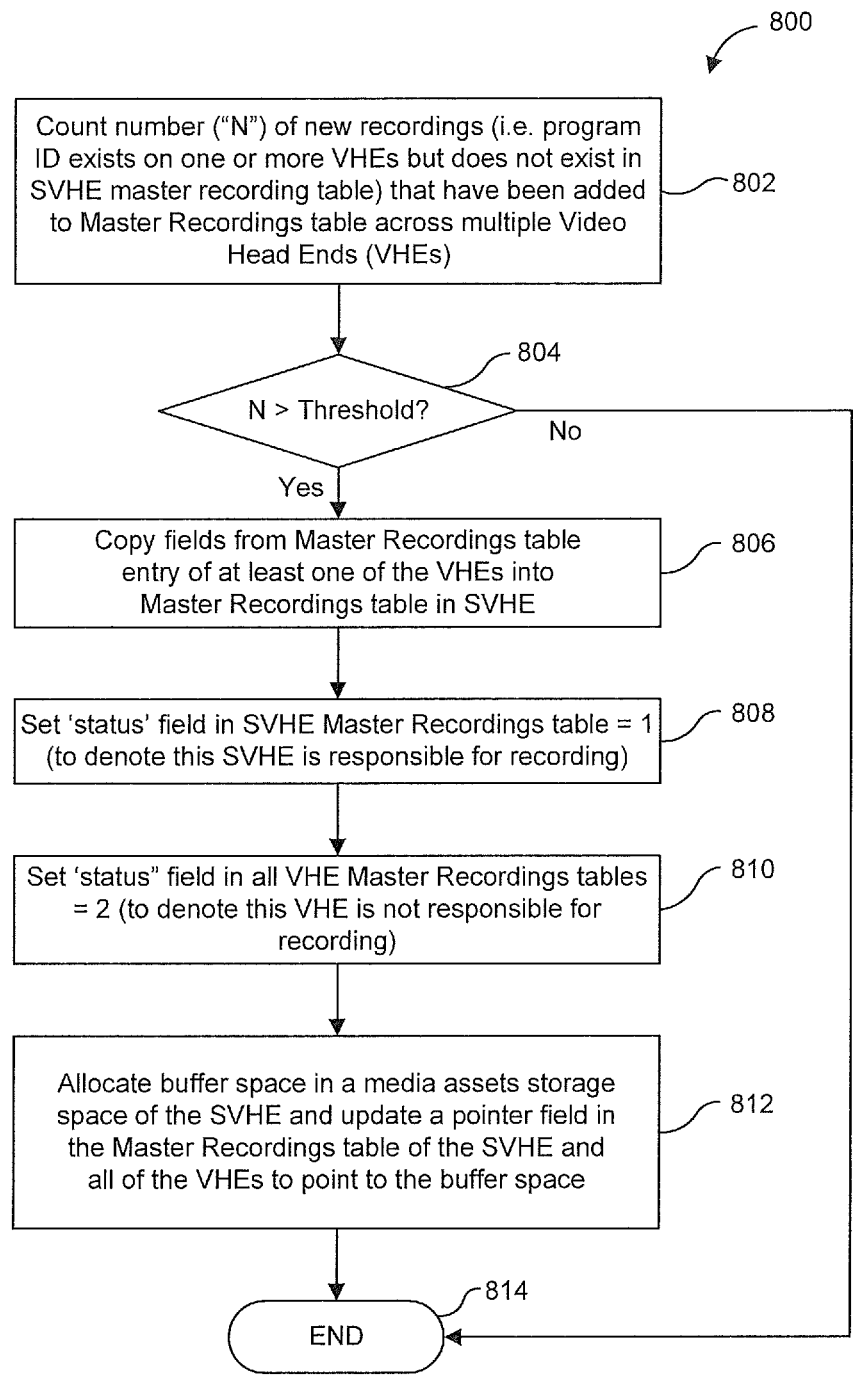
FIG. 8 is a flow chart of a fourth particular illustrative embodiment of a method of recording multimedia data.

FIG. 8 depicts a flow chart of a fourth particular illustrative embodiment of a method 800 to record multimedia data. The method 800 may include counting a number of new recordings that have been added to master recording tables across multiple video head ends (VHEs), at 802. The new recordings may be identified based on program identification information that exists in at least one master recording table associated with at least one of the multiple VHEs but the program identification information does not exist in a master recording table of the super video head end (SVHE). In a particular embodiment, the master recording tables store data related to specific programs to be recorded or that are available to a user device, such as the master recording table 402 shown in FIG. 4.

The method 800 may include determining when the number of new recordings exceeds a threshold, at 804. When the number of new recordings is not greater than the threshold, the method 800 terminates, at 814.

Returning to 804, when the number of new recordings exceeds the threshold, the method 800 may include copying at least one field from at least one of the master recordings tables associated with the at least one of the multiple VHEs to the master recordings table of the SVHE, at 806. The method 800 may also include setting a status field in the master recording table of the SVHE to denote that the SVHE is responsible for storing the new recording, at 808. The method 800 may also include setting a status field in the master recordings tables of each of the multiple VHEs to denote that each respective VHE is not responsible for storing the new recording, at 810.

The method 800 may also include allocating buffer space in a media assets storage space on the SVHE, at 812. Further, the method 800 may include updating a pointer in the master recordings table of the SVHE to indicate the location of the buffer space that was allocated, at 812. Even further, the method 800 may include updating a pointer in the master recordings tables of all of the VHEs to indicate the location of the buffer space that was allocated, at 812. The method 800 terminates, at 814.

Figure 9:
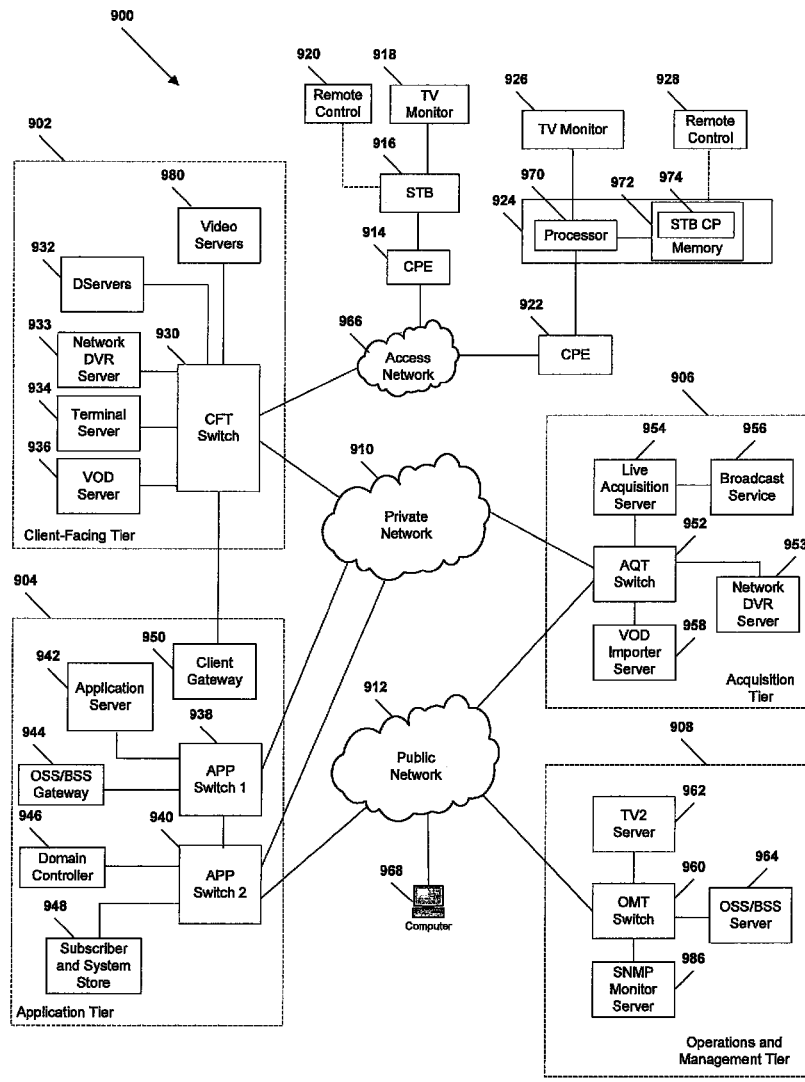
FIG. 9 is a block diagram of a fourth particular embodiment of a system to record and access multimedia data.

Referring to FIG. 9, an illustrative embodiment of an Internet Protocol Television (IPTV) system that may store and distribute video data is illustrated and is generally designated 900. As shown, the system 900 can include a client facing tier 902, an application tier 904, an acquisition tier 906, and an operations and management tier 908. Each tier 902, 904, 906, 908 is coupled to a private network 910; to a public network 912, such as the Internet; or to both the private network 910 and the public network 912. For example, the client-facing tier 902 can be coupled to the private network 910. Further, the application tier 904 can be coupled to the private network 910 and to the public network 912. The acquisition tier 906 can also be coupled to the private network 910 and to the public network 912. Additionally, the operations and management tier 908 can be coupled to the public network 912.

As illustrated in FIG. 9, the various tiers 902, 904, 906, 907 communicate with each other via the private network 910 and the public network 912. For instance, the client-facing tier 902 can communicate with the application tier 904 and the acquisition tier 906 via the private network 910. The application tier 904 can communicate with the acquisition tier 906 via the private network 910. Further, the application tier 904 can communicate with the acquisition tier 906 and the operations and management tier 908 via the public network 912. Moreover, the acquisition tier 906 can communicate with the operations and management tier 908 via the public network 912. In a particular embodiment, elements of the application tier 904, including, but not limited to, a client gateway 950, can communicate directly with the client-facing tier 902.

The client-facing tier 902 can communicate with user equipment via an access network 966, such as an Internet Protocol Television (IPTV) access network. In an illustrative embodiment, customer premises equipment (CPE) 914, 922 can be coupled to a local switch, router, or other device of the access network 966. The client-facing tier 902 can communicate with a first representative set-top box device 916 via the first CPE 914 and with a second representative set-top box device 924 via the second CPE 922. In a particular embodiment, the first representative set-top box device 916 and the first CPE 914 can be located at a first customer premise, and the second representative set-top box device 924 and the second CPE 922 can be located at a second customer premise. In another particular embodiment, the first representative set-top box device 916 and the second representative set-top box device 924 can be located at a single customer premise, both coupled to one of the CPE 914, 922. The CPE 914, 922 can include routers, local area network devices, modems, such as digital subscriber line (DSL) modems, any other suitable devices for facilitating communication between a set-top box device and the access network 966, or any combination thereof.

In an exemplary embodiment, the client-facing tier 902 can be coupled to the CPE 914, 922 via fiber optic cables. In another exemplary embodiment, the CPE 914, 922 can be digital subscriber line (DSL) modems that are coupled to one or more network nodes via twisted pairs, and the client-facing tier 902 can be coupled to the network nodes via fiber-optic cables. Each set-top box device 916, 924 can process data received via the access network 966, via an IPTV software platform, such as Microsoft® TV IPTV Edition.

The first set-top box device 916 can be coupled to a first external display device, such as a first television monitor 918, and the second set-top box device 924 can be coupled to a second external display device, such as a second television monitor 926. Moreover, the first set-top box device 916 can communicate with a first remote control 920, and the second set-top box device 924 can communicate with a second remote control 928. The set-top box devices 916, 924 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof. Additionally, each set-top box device 916, 924 may be coupled to more than one external display device. Additionally, each set-top box device may communicate with more than one remote control device.

In an exemplary, non-limiting embodiment, each set-top box device 916, 924 can receive data, video, or any combination thereof, from the client-facing tier 902 via the access network 966 and render or display the data, video, or any combination thereof, at the display device 918, 926 to which it is coupled. Each set-top box 916, 924 may also send commands or other information to other devices of the IPTV system via the access network 966. In an illustrative embodiment, the set-top box devices 916, 924 can include tuners that receive and decode television programming signals or packet streams for transmission to the display devices 918, 926. Further, the set-top box devices 916, 924 can include a STB processor 970 and a STB memory device 972 that is accessible to the STB processor 970. In one embodiment, a computer program, such as the STB computer program 974, can be embedded within the STB memory device 972.

In an illustrative embodiment, the client-facing tier 902 can include a client-facing tier (CFT) switch 930 that manages communication between the client-facing tier 902 and the access network 966 and between the client-facing tier 902 and the private network 910. As illustrated, the CFT switch 930 is coupled to one or more data servers, such as D-servers 932, that store, format, encode, replicate, or otherwise manipulate or prepare video content for communication from the client-facing tier 902 to the set-top box devices 916, 924. The CFT switch 930 can also be coupled to a terminal server 934 that provides terminal devices with a connection point to the private network 910. In a particular embodiment, the CFT switch 930 can be coupled to a video-on-demand (VOD) server 936 that stores or provides VOD content imported by the IPTV system 900. Further, the CFT switch 930 is coupled to one or more video servers 980 that receive video content and transmit the content to the set-top boxes 916, 924 via the access network 966. In a particular embodiment, the CFT switch 930 may be coupled to a network DVR server 933, such as the network DVR server depicted in FIGS. 1 and 2.

In an illustrative embodiment, the client-facing tier 902 can communicate with a large number of set-top boxes, such as the representative set-top boxes 916, 924 over a wide geographic area, such as a metropolitan area, a viewing area, a statewide area, a regional area, a nationwide area or any other suitable geographic area, market area, or subscriber or customer group that can be supported by networking the client-facing tier 902 to numerous set-top box devices. In a particular embodiment, the CFT switch 930, or any portion thereof, can include a multicast router or switch that communicates with multiple set-top box devices via a multicast-enabled network.

As illustrated in FIG. 9, the application tier 904 can communicate with both the private network 910 and the public network 912. The application tier 904 can include a first application tier (APP) switch 938 and a second APP switch 940. In a particular embodiment, the first APP switch 938 can be coupled to the second APP switch 940. The first APP switch 938 can be coupled to an application server 942 and to an OSS/BSS gateway 944. In a particular embodiment, the application server 942 can provide applications to the set-top box devices 916, 924 via the access network 966, which enable the set-top box devices 916, 924 to provide functions, such as interactive program guides, video gaming, display, messaging, processing of VOD material and other IPTV content, etc. In an illustrative embodiment, the application server 942 can provide location information to the set-top box devices 916, 924. In a particular embodiment, the OSS/BSS gateway 944 includes operation systems and support (OSS) data, as well as billing systems and support (BSS) data. In one embodiment, the OSS/BSS gateway 944 can provide or restrict access to an OSS/BSS server 964 that stores operations and billing systems data.

The second APP switch 940 can be coupled to a domain controller 946 that provides Internet access, for example, to users at their computers 968 via the public network 912. For example, the domain controller 946 can provide remote Internet access to IPTV account information, e-mail, personalized Internet services, or other online services via the public network 912. In addition, the second APP switch 940 can be coupled to a subscriber and system store 948 that includes account information, such as account information that is associated with users who access the IPTV system 900 via the private network 910 or the public network 912. In an illustrative embodiment, the subscriber and system store 948 can store subscriber or customer data and create subscriber or customer profiles that are associated with IP addresses, stock-keeping unit (SKU) numbers, other identifiers, or any combination thereof, of corresponding set-top box devices 916, 924. In another illustrative embodiment, the subscriber and system store 948 can store data associated with capabilities of set-top box devices 916, 924 associated with particular customers.

In a particular embodiment, the application tier 904 can include a client gateway 950 that communicates data directly to the client-facing tier 902. In this embodiment, the client gateway 950 can be coupled directly to the CFT switch 930. The client gateway 950 can provide user access to the private network 910 and the tiers coupled thereto. In an illustrative embodiment, the set-top box devices 916, 924 can access the IPTV system 900 via the access network 966, using information received from the client gateway 950. User devices can access the client gateway 950 via the access network 966, and the client gateway 950 can allow such devices to access the private network 910 once the devices are authenticated or verified. Similarly, the client gateway 950 can prevent unauthorized devices, such as hacker computers or stolen set-top box devices from accessing the private network 910, by denying access to these devices beyond the access network 966.

For example, when the first representative set-top box device 916 accesses the client-facing tier 902 via the access network 966, the client gateway 950 can verify subscriber information by communicating with the subscriber and system store 948 via the private network 910. Further, the client gateway 950 can verify billing information and status by communicating with the OSS/BSS gateway 944 via the private network 910. In one embodiment, the OSS/BSS gateway 944 can transmit a query via the public network 912 to the OSS/BSS server 964. After the client gateway 950 confirms subscriber and/or billing information, the client gateway 950 can allow the set-top box device 916 to access IPTV content and VOD content at the client-facing tier 902. If the client gateway 950 cannot verify subscriber information for the set-top box device 916, e.g., because it is connected to an unauthorized twisted pair, the client gateway 950 can block transmissions to and from the set-top box device 916 beyond the access network 966.

As indicated in FIG. 9, the acquisition tier 906 includes an acquisition tier (AQT) switch 952 that communicates with the private network 910. The AQT switch 952 can also communicate with the operations and management tier 908 via the public network 912. In a particular embodiment, the AQT switch 952 can be coupled to a live acquisition server 954 that receives or acquires television content, movie content, advertisement content, other video content, or any combination thereof, from a broadcast service 956, such as a satellite acquisition system or satellite head-end office. In a particular embodiment, the live acquisition server 954 can transmit content to the AQT switch 952, and the AQT switch 952 can transmit the content to the CFT switch 930 via the private network 910. In a particular embodiment, the AQT switch 952 may be coupled to a network DVR server 953, such as the network DVR server depicted in FIGS. 1 and 2.

In an illustrative embodiment, content can be transmitted to the D-servers 932, where it can be encoded, formatted, stored, replicated, or otherwise manipulated and prepared for communication from the video server(s) 980 to the set-top box devices 916, 924. The CFT switch 930 can receive content from the video server(s) 980 and communicate the content to the CPE 914, 922 via the access network 966. The set-top box devices 916, 924 can receive the content via the CPE 914, 922, and can transmit the content to the television monitors 918, 926. In an illustrative embodiment, video or audio portions of the content can be streamed to the set-top box devices 916, 924.

In an illustrative embodiment, content can be transmitted to the network DVR 933, where it can be encoded, formatted, stored, replicated, or otherwise manipulated and prepared for retention in a program database.

Further, the AQT switch 952 can be coupled to a video-on-demand importer server 958 that receives and stores television or movie content received at the acquisition tier 906 and communicates the stored content to the VOD server 936 at the client-facing tier 902 via the private network 910. Additionally, at the acquisition tier 906, the video-on-demand (VOD) importer server 958 can receive content from one or more VOD sources outside the IPTV system 900, such as movie studios and programmers of non-live content. The VOD importer server 958 can transmit the VOD content to the AQT switch 952, and the AQT switch 952, in turn, can communicate the material to the CFT switch 930 via the private network 910. The VOD content can be stored at one or more servers, such as the VOD server 936.

When users issue requests for VOD content via the set-top box devices 916, 924, the requests can be transmitted over the access network 966 to the VOD server 936, via the CFT switch 930. Upon receiving such requests, the VOD server 936 can retrieve the requested VOD content and transmit the content to the set-top box devices 916,724 across the access network 966, via the CFT switch 930. The set-top box devices 916, 924 can transmit the VOD content to the television monitors 918, 926. In an illustrative embodiment, video or audio portions of VOD content can be streamed to the set-top box devices 916, 924.

FIG. 9 further illustrates that the operations and management tier 908 can include an operations and management tier (OMT) switch 960 that conducts communication between the operations and management tier 908 and the public network 912. In the embodiment illustrated by FIG. 9, the OMT switch 960 is coupled to a TV2 server 962. Additionally, the OMT switch 960 can be coupled to an OSS/BSS server 964 and to a simple network management protocol (SNMP) monitor server 986 that monitors network devices within or coupled to the IPTV system 900. In a particular embodiment, the OMT switch 960 can communicate with the AQT switch 952 via the public network 912.

In an illustrative embodiment, the live acquisition server 954 can transmit content to the AQT switch 952, and the AQT switch 952, in turn, can transmit the content to the OMT switch 960 via the public network 912. In this embodiment, the OMT switch 960 can transmit the content to the TV2 server 962 for display to users accessing the user interface at the TV2 server 962. For example, a user can access the TV2 server 962 using a personal computer 968 coupled to the public network 912.

In an illustrative embodiment, a user may communicate a request to record a program via the first representative STB device 916 using the remote control 920. The first representative STB device 916 may communicate the request to the network DVR 933 via the CPE 914, the access network 966, and the CFT switch 930. The network DVR 933 may create a record associating the user with the recorded program. The network DVR 933 may also indicate a number of requests associated with the program.

In an illustrative embodiment, when the user desires to watch a recorded program, the user may send a request to identify programs the user has requested to be recorded via the first representative STB device 916 using the remote control 920. The network DVR 933 may query the reservation records associated with the user and send data identifying the programs the user has recorded to the first representative STB device 916. The first representative STB device 916 may generate a user interface listing the programs that the user has reserved and display the user interface at TV monitor 918. The user may select a program from the user interface using the remote control 920. In response, the first representative STB device 916 may send a request to playback the program. The network DVR 933 may access the program in memory, and transmit the program data to the first representative STB device 916 in an appropriate format. The first representative STB device 916 may receive the program data and generate a display at the TV monitor 926 including the program.

In a particular illustrative embodiment, the network DVR 953 may record the program that was requested to be recorded by the network DVR 933. In a particular embodiment, the network DVR 953 may record the program when a number of requests to record the program is greater than a threshold. In another particular illustrative embodiment, the network DVR 953 may record a program without receiving a request from a STB device.

Figure 10:
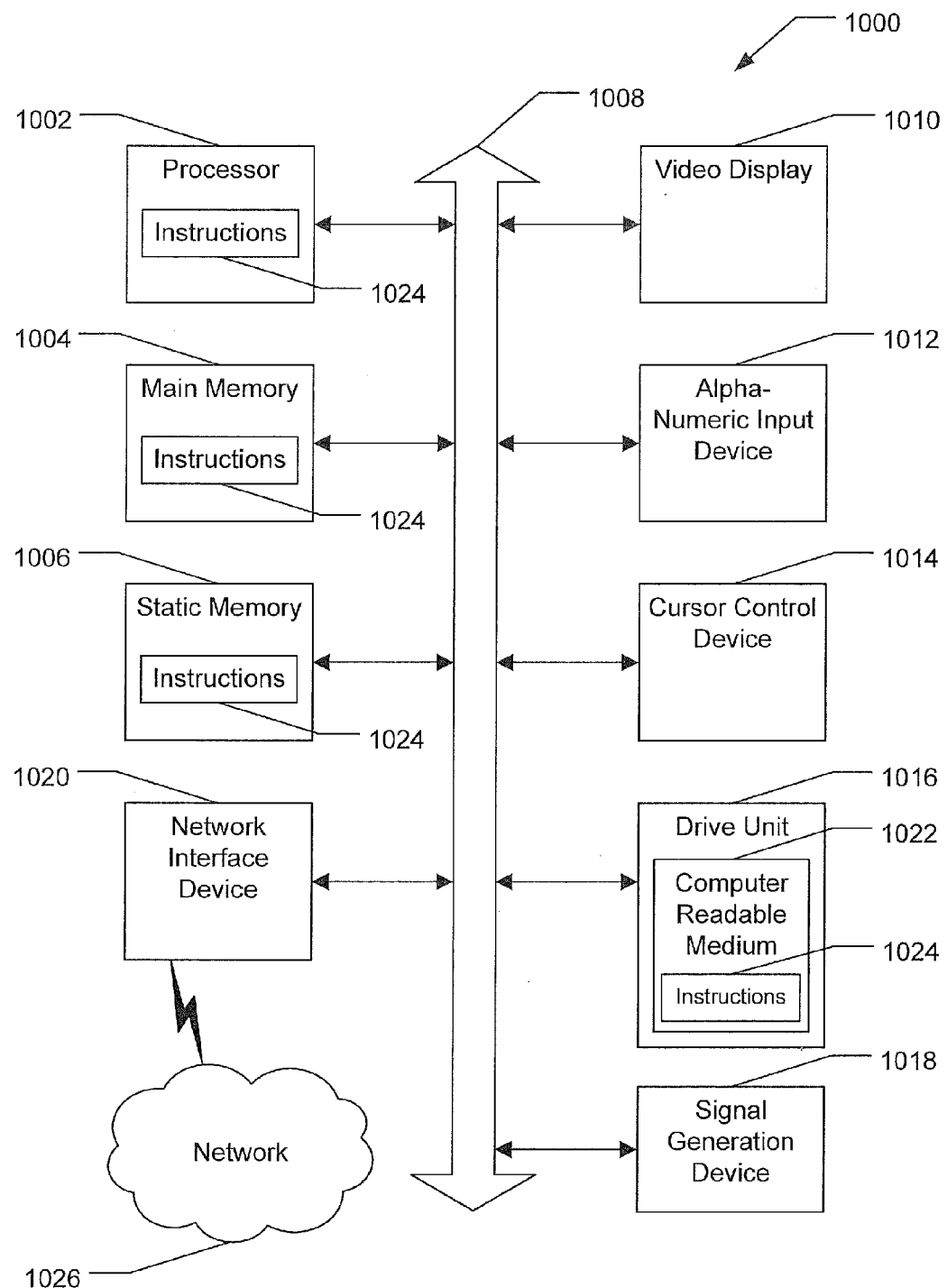
FIG. 10 is a block diagram of a particular illustrative embodiment of a general computing system.

Referring to FIG. 10, an illustrative embodiment of a general computer system is shown and is designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices, such as a VHE, SVHE, CPE, set-top box device, or other server or user device, as illustrated in FIGS. 1-3 and FIG. 9.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 can also include a disk drive unit 1016, a signal generation device 1018, such as a speaker or remote control, and a network interface device 1020.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving, at a first server, information from a second server indicating a number of requests received by the second server to record a multimedia program;
determining whether the first server is responsible to record the multimedia program based on the number of requests; and
when the first server is responsible to record the multimedia program:
recording the multimedia program at the first server;
receiving, at the first server while the multimedia program is being recorded at the first server, a request from a customer premise equipment device to initiate transmission of a stream of the multimedia program; and
granting the request from the customer premise equipment device and providing the customer premise equipment device access to a portion of the multimedia program recorded at the first server prior to the first server receiving the request from the customer premise equipment device.

2. The method of claim 1, wherein determining whether the first server is responsible to record the multimedia program is further based on a second request received by the first server to record the multimedia program.

3. The method of claim 2, wherein the second request is received prior to a start time of the multimedia program.

4. The method of claim 1, wherein determining whether the first server is responsible to record the multimedia program is further based on a likelihood that the multimedia program will be requested by the customer premise equipment device.

5. The method of claim 1, wherein determining whether the first server is responsible to record the multimedia program comprises determining that the first server is responsible to record the multimedia program when the number of requests received by the second server is greater than or equal to a threshold.

6. The method of claim 5, wherein determining whether the first server is responsible to record the multimedia program comprises determining that the second server is responsible to record the multimedia program when the number of requests received by the second server is less than the threshold.

7. The method of claim 1, wherein determining whether the first server is responsible to record the multimedia program comprises determining that the second server is responsible to record the multimedia program when the multimedia program is valid only for customer premise equipment devices connected to the second server.

8. The method of claim 1, further comprising:
receiving a request from a second customer premise equipment device to initiate transmission of a second stream of the multimedia program, wherein the request from the second customer premise equipment device is received prior to a start time of the multimedia program; and
providing the second customer premise equipment device access to the multimedia program after the multimedia program has been recorded by the first server.

9. The method of claim 1, further comprising transmitting the multimedia program from the first server to a third server that is configured to provide the multimedia program to a plurality of customer premise equipment devices.

10. The method of claim 1, wherein the customer premise equipment device comprises a display device, a set-top box device, a video game console, a cable card, a personal computer, a router, a local area network device, a modem, or any combination thereof.

11. The method of claim 1, wherein the first server and the second server are part of an internet protocol television network, and wherein the access to the portion of the multimedia program is provided in response to receipt by a content provider of a fee.

12. An apparatus comprising:
a processor; and
a memory storing instructions executable by the processor to perform operations including:
receiving, at a first server, information from a second server indicating a number of requests received by the second server to record a multimedia program;
determining whether the first server is responsible to record the multimedia program based on the number of requests; and
when the first server is responsible to record the multimedia program:
recording the multimedia program at the first server;
receiving, at the first server while the multimedia program is being recorded, a request from a customer premise equipment device to initiate transmission of a stream of the multimedia program; and
granting the request from the customer premise equipment device and providing the customer premise equipment device access to a portion of the multimedia program recorded at the first server prior to the first server receiving the request from the customer premise equipment device.

13. The apparatus of claim 12, wherein the operations further comprise selectively rejecting a request received by the first server to record the multimedia program at the first server in response to determining that the second server is responsible to record the multimedia program.

14. The apparatus of claim 12, wherein determining whether the first server is responsible to record the multimedia program is further based on a storage capacity of the first server, a storage capacity of the second server, a bandwidth of the first server, a bandwidth of the second server, an ability of the first server to record the multimedia program, an ability of the second server to record the multimedia program, a likelihood that customer premise equipment devices in multiple geographic areas serviced by the first server would request to record the multimedia program, or any combination thereof.

15. The apparatus of claim 12, wherein the operations further comprise:
receiving a request from a second customer premise equipment device to initiate transmission of a second stream of the multimedia program, wherein the request from the second customer premise equipment device is received prior to a start time of the multimedia program; and
granting the request from the second customer premise equipment device and providing the second customer premise equipment device access to the multimedia program after the multimedia program has been recorded by the first server.

16. A computer readable storage device storing instructions, that when executed by a processor, cause the processor to perform operations comprising:
receiving, at a first server, information from a second server indicating a number of requests received by the second server to record a multimedia program; and
determining whether the first server is responsible to record the multimedia program based on the number of requests;
when the first server is responsible to record the multimedia program:
recording the multimedia program at the first server;
receiving, at the first server while the multimedia program is being recorded at the first server, a request from a customer premise equipment device to initiate transmission of a stream of the multimedia program; and
granting the request from the customer premise equipment device and providing the customer premise equipment device access to a portion of the multimedia program recorded at the first server prior to the first server receiving the request from the customer premise equipment device.

17. The computer readable storage device of claim 16, wherein determining whether the first server is responsible to record the multimedia program is further based on a second request to record the multimedia program, wherein the second request is received prior to a start time of the multimedia program.

18. The computer readable storage device of claim 16, wherein determining whether the first server is responsible to record the multimedia program is further based on a likelihood that the multimedia program will be requested by the customer premise equipment device.

19. The computer readable storage device of claim 16, wherein the operations further comprise determining that the second server is responsible to record the multimedia program
in response to determining that the number of requests is less than a threshold.

20. The computer readable storage device of claim 16, wherein the operations further comprise:

receiving a request from a second customer premise equipment device to initiate transmission of a second stream of the multimedia program, wherein the request from the second customer premise equipment device is received prior to a start time of the multimedia program; and granting the request from the second customer premise equipment device and providing the second customer premise equipment device access to the multimedia program.

* * * * *